United States Patent [19]
Honma

[11] Patent Number: 5,129,024
[45] Date of Patent: Jul. 7, 1992

[54] OPTICAL CONNECTOR IN WHICH A CABLE HOLDER IS ACCOMMODATED WITHIN A CONNECTOR HOUSING

[75] Inventor: Kiyoaki Honma, Yokohama, Japan

[73] Assignee: Yamaichi Electric Co., Ltd., Tokyo, Japan

[21] Appl. No.: 746,945

[22] Filed: Aug. 19, 1991

[30] Foreign Application Priority Data

Aug. 22, 1990 [JP] Japan .................. 2-222229
Aug. 22, 1990 [JP] Japan .................. 2-222230

[51] Int. Cl.⁵ .............................................. G02B 6/32
[52] U.S. Cl. ........................................ 385/76; 385/53
[58] Field of Search .................. 385/53, 76, 77, 78

[56] References Cited

U.S. PATENT DOCUMENTS

| 5,016,968 | 5/1991 | Hammond et al. | 385/78 |
| 5,037,175 | 8/1991 | Weber | 385/76 |
| 5,044,721 | 9/1991 | Nakamura | 385/53 |

Primary Examiner—Akm E. Ullah
Assistant Examiner—Phan T. Heartney
Attorney, Agent, or Firm—Wenderoth, Lind & Ponack

[57] ABSTRACT

In an optical connector in which a cable holder reciprocally movably accommodated within a connector housing is urged forward by springs to expose a front end of the holder from a front end of the connector housing, a pair of lock arms are disposed along the longitudinal side portions of the connector housing, and the lock arms are resiliently displaced inwardly at front ends thereof where retaining claws are formed, so as to cancel a connected state with an objective member and restored outwardly in order to obtain a connected state with the objective member, the optical connector is characterized in that the pair of lock arms are disposed along the longitudinal side surfaces of the cable holder, the springs are disposed in spaces formed between the lock arms and the longitudinal side surfaces of the cable holder, the lock arms and the cable holder are resiliently contacted with each other by the springs through inclined guides which are formed on one or both opposing places, the cable holder is pushed down backwardly against the springs through the inclined surfaces when the lock arms are resiliently displaced inwardly to cancel the connected relation, and the case holder is progressed forwardly urged by the springs to urgedly support the lock arms from inner sides thereof through the inclined guides when the lock arms are restored outwardly.

2 Claims, 4 Drawing Sheets

OPTICAL CONNECTOR IN WHICH A CABLE HOLDER IS ACCOMMODATED WITHIN A CONNECTOR HOUSING

BACKGROUND OF THE INVENTION

1. Field of the Invention

This invention relates to an optical connector including a housing for resiliently contacting a cable holder provided with a pair of lock arms adapted to be connected with a member (hereinafter referred to as "objective member) to be connected.

2. Brief Description of the Prior Art

A conventional optical connector, as exemplified in FIGS. 7 and 8, includes a connector housing 1, a cable holder 2 reciprocally movably accommodated within the connector housing 1, springs 3 disposed within the connector housing 1 and adapted to bias the cable holder 2 forward so as to expose a front end of the holder from a front end of the housing 1, and a pair of lock arms 4 mounted on the connector housing 1 and adapted to connect with an objective member such as a connector to be connected, etc.

The lock arms 4 are disposed in such a manner as to extend along the longitudinal outer sides of the connector housing 1, in other words, along the longitudinal outer side walls of the connector housing 1 in parallel relation. The lock arms 4 are provided with a retaining claw 5 at each front end portion thereof. By resiliently displacing the arms 4 at their front end portions where the retaining claws 5 are formed, a connected relation with the objective member is canceled, and by restoring the arms outwardly, the connected relation with the objective member is realized once again. The numeral 6 denotes an optical cable which is connected to and held by the cable holder 2. The optical cable 6 is inserted into the cable holder 2 from its rear end such that a core end face of the optical cable 6 exposes from a front end face of the holder 2 in order to facilitate an opposing connection with an optical cable or an optical element of the objective member.

As described above, since the above-mentioned conventional optical connector is designed such that a pair of lock arms are disposed in such a manner as to extend along the longitudinal outer side walls of a connector housing and at a predetermined space from each longitudinal outer side wall of the connector housing in parallel relation so as to permit the lock arms to be resiliently displaced inwardly, it has such a problem as that the optical connector as a whole is prevented from being reduced in size, particularly in the width direction and is obliged to be made large in size.

Further, since the springs are made as long in length as possible from the necessity to provide an easy and smooth operation of the lock arms, the physical strength of the arms is decreased and repeated operations cause the lock arms to be fatigued, thus jeopardizing the connecting function thereof.

Furthermore, since the lock arms are disposed in such a manner as to be spaced apart from the connector housing and extend longitudinally therealong from its rear end connecting portion toward its front end, there arises such a problem as that the lock arms are broken due to impact applied thereto from front when the connector is inserted, dropped, or the like.

The present invention has been accomplished in order to obviate these problems inherent in the conventional optical connectors.

SUMMARY OF THE INVENTION

It is therefore an object of the present invention to provide an optical connector which can be made as small in size as possible and in which the sound function of the lock arms can simultaneously be attained as originally intended.

Another object of the invention is to provide an optical connector having the above-mentioned lock arms, which can be made as small in size as possible and in which the problem of possible breakage of the lock arms caused by an external impact can be solved at the same time, thus enabling to attain the sound function of the lock arms.

To achieve the above objects, the present invention is designed such that in an optical connector in which a connected state and a disconnected state with an objective member can be realized by means of resilient displacement of a pair of lock arms outwardly and inwardly, the lock arms are disposed in such a manner as to extend along longitudinal side surfaces of a cable holder accommodated within a connector housing, springs are disposed in spaces formed between the lock arms and the longitudinal side surfaces of the cable holder, one or both of the lock arms and the cable holder are provided with inclined guides at opposing places thereof, so that they can be resiliently contacted with each other by the bias of the springs through the inclined guides, the cable holder is pushed down backwardly against the springs when the lock arms are resiliently displaced inwardly to cancel the connected relation, and the cable holder is progressed forwardly urged by the springs to urgedly support the lock arms from inner sides thereof through the inclined guides when the lock arms are restored outwardly.

From another aspect, the present invention is designed such that in an optical connector in which a connected state and a disconnected state with an objective member are realized by resiliently displacing a pair of lock arms inwardly and outwardly, side openings are formed in longitudinal side surfaces of the connector housing, the lock arms are disposed in such a manner as to extend along the side openings so that front end portions of the arms can be resiliently displaced into the side openings, and said connector housing is provided with an end wall opposite the front end faces of said lock arms and defining said side openings.

In the present invention, the lock arms, as described above, extend along the longitudinal side surfaces of the cable holder and the lock arms are disposed at portions where longitudinal side walls of the connector housing are originally formed. When the lock arms are resiliently displaced inwardly and outwardly at these portions, they move the cable holder forward and backward through the inclined guides to obtain a required resilient displacement. Accordingly, an intended smooth operation can be obtained while attaining a small size and saving material both in an extensive degree compared with the conventional optical connector in which a pair of lock arms are disposed in such a manner as to extend along the longitudinal side walls of the connector housing but at a predetermined space therefrom. Further, since the lock arms are normally resiliently contacted and supported from inner sides thereof by the cable holder which is resiliently contacted with the lock arms by the springs when the lock arms are displaced inwardly (cancellation of the connected state) and when the lock arms are displaced outwardly (realization of the connected state), the fatigue problem of the lock arms can be solved effectively, and the sound function of the lock arms can be maintained in spite of their repeated operations. This further makes it possible to reduce the thickness of the lock arms (realization of a slender size of the lock arms) and to form the springs comparatively short in length in order to facilitate an easy and smooth operation thereof. In addition, the whole device can be made smaller by virtue of the foregoing arrangement.

Furthermore, from another aspect, the present invention is designed such that the lock arms are disposed in such a manner as to extend along the side openings formed in the longitudinal side surfaces of the cable holder and the lock arms can be disposed at portions where the longitudinal side walls of the connector housing are originally formed as already described above. The lock arms are resiliently displaced at those portions through the side openings to realize the connected relation and disconnected relation with the objective member. Accordingly, an intended smooth operation can be obtained while attaining a small size of an optical connector and saving material both in an extensive degree compared with the conventional optical connector in which a pair of lock arms are disposed in such a manner as to extend along the longitudinal side walls of the connector housing but at a predetermined space therefrom. Further, by virtue of the provision of the end wall opposite the front end faces of the lock arms, there can be prevented an impact from applying to the lock arms from front thereof and the problem of possible breakage of the lock arms can be solved effectively when the optical connector is inserted by mistake or when it is accidentally dropped.

DETAILED DESCRIPTION OF THE EMBODIMENT

Figure 1:
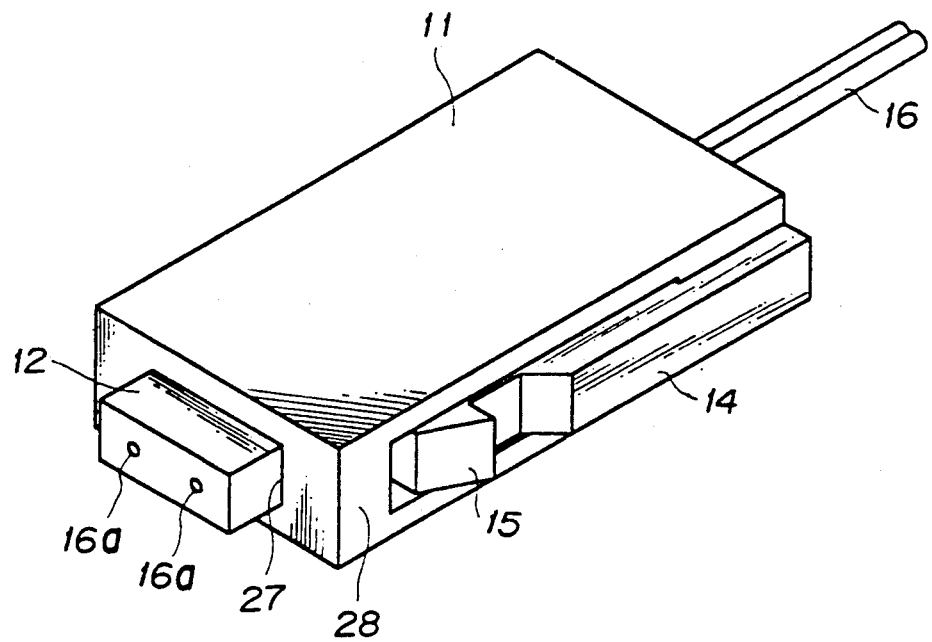
FIG. 1 is a perspective view of an optical connector according to one embodiment of the present invention.
Figure 2:
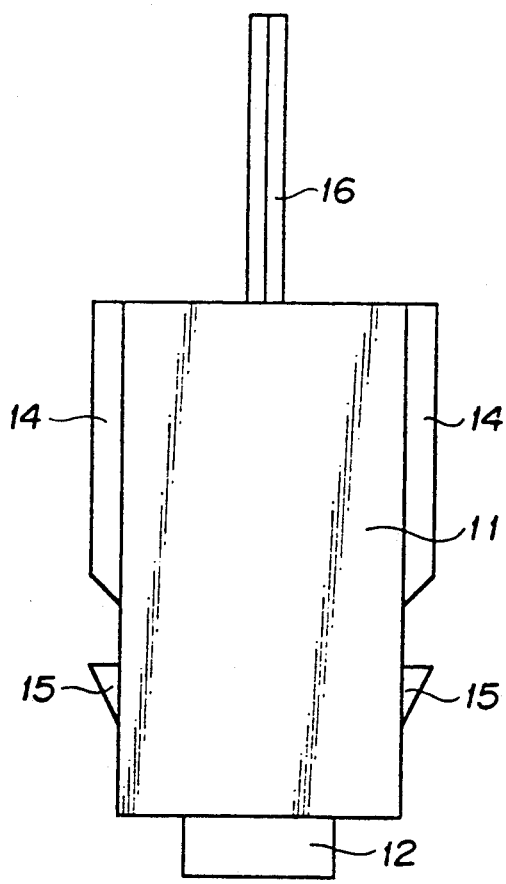
FIG. 2 is a plan view thereof.
Figure 3:
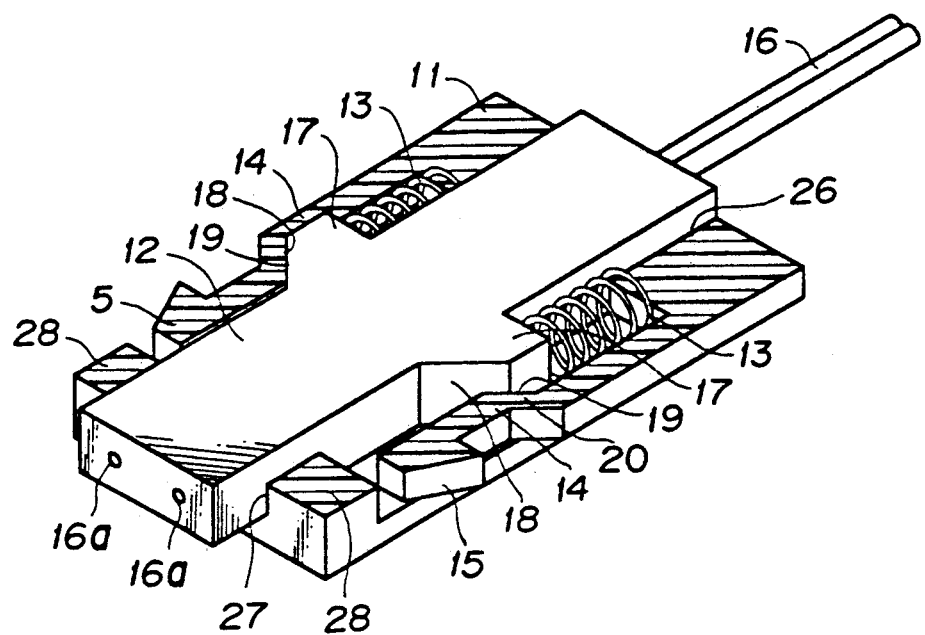
FIG. 3 is a perspective view, horizontally cut into a half, thereof.

One embodiment of the present invention will be described with reference to FIGS. 1 through 6.

The numeral 11 denotes a connector housing formed of an insulator material, and 12 a cable holder. The cable holder 12 is inserted at a rear end portion thereof into the connector housing 11 through an opening 26 formed in a rear face thereof and reciprocally movably accommodated within the connector housing 11. Coil springs 13 are disposed within the housing 11 and adapted to urge the cable holder 12 forward so that the front end of the holder 12 is caused to expose from a front end of the housing 1. An optical cable 16 is inserted into the cable holder 12 from a rear end face thereof and held therein with its core 16a exposed at the front end face of the housing 11 so as to be subjected to an opposing connection with the core of an optical cable or various kinds of optical elements which the objective member has.

The cable holder 12 is provided with lugs 17 formed in a symmetrical relation on both sides thereof and adapted to bear the coil springs 13, which are disposed along the longitudinal sides of the cable holder 12, at the rear faces thereof so that the coil springs 13 can urge the cable holder 12 forward. On the other hand, the numeral 14 denotes a pair of lock arms which are connected at one ends thereof with the rear end of the connector housing 11 and extend from the rear end toward the front end along the longitudinal sides of the cable holder 12. The front ends of the lock arms 14 are served as free ends which are each provided with a retaining claw 15 facing outward.

A side opening 25 is formed in each longitudinal side surface of the housing 11, and the lock arms 15 are disposed in such a manner as to extend along the side openings 25. A space for accommodating the cable holder 12 therein is formed between the pair of lock arms 14, and spaces for receiving the springs 13 are formed between the cable holder 12 and the lock arms 14, so that the lock arms 14 are resiliently displaced in such a manner as to be bent toward the interior of the housing 11 through the side openings 25 to realize the above-mentioned connected state and disconnected state. Further, the housing 11 is provided with an end wall 28 opposite the front end faces of the lock arms 14 which are bent into the side openings 25 as illustrated and defining the side openings 28. The end wall 28 is adapted prevent an impact pact from being incurred to the front ends of the lock arms 14 from front and served as means for functioning the lock arms 14 soundly.

Figure 4:
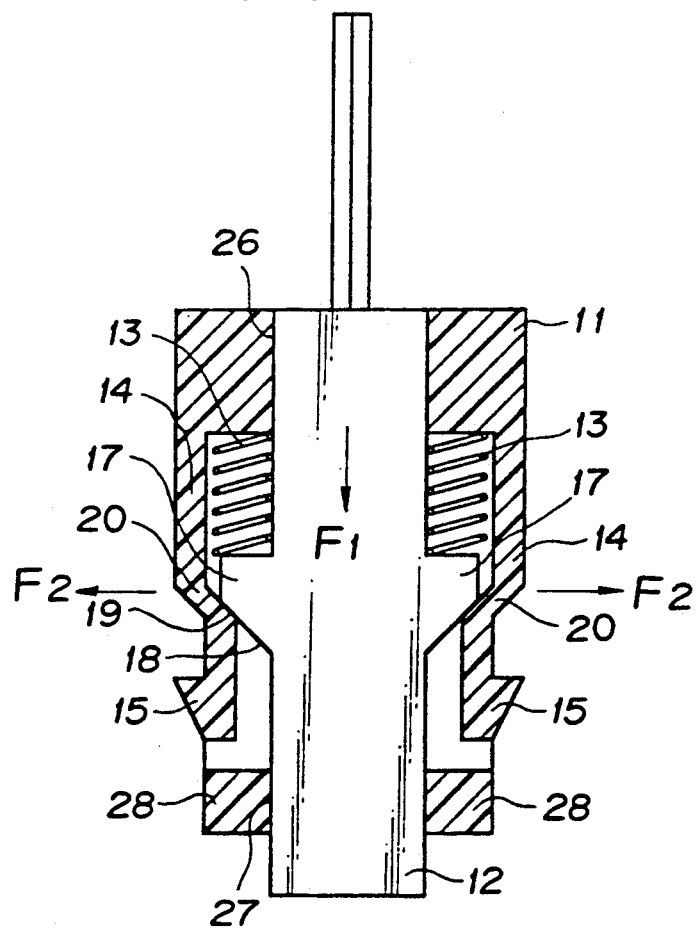
FIG. 4 is a plan view thereof.
Figure 5:
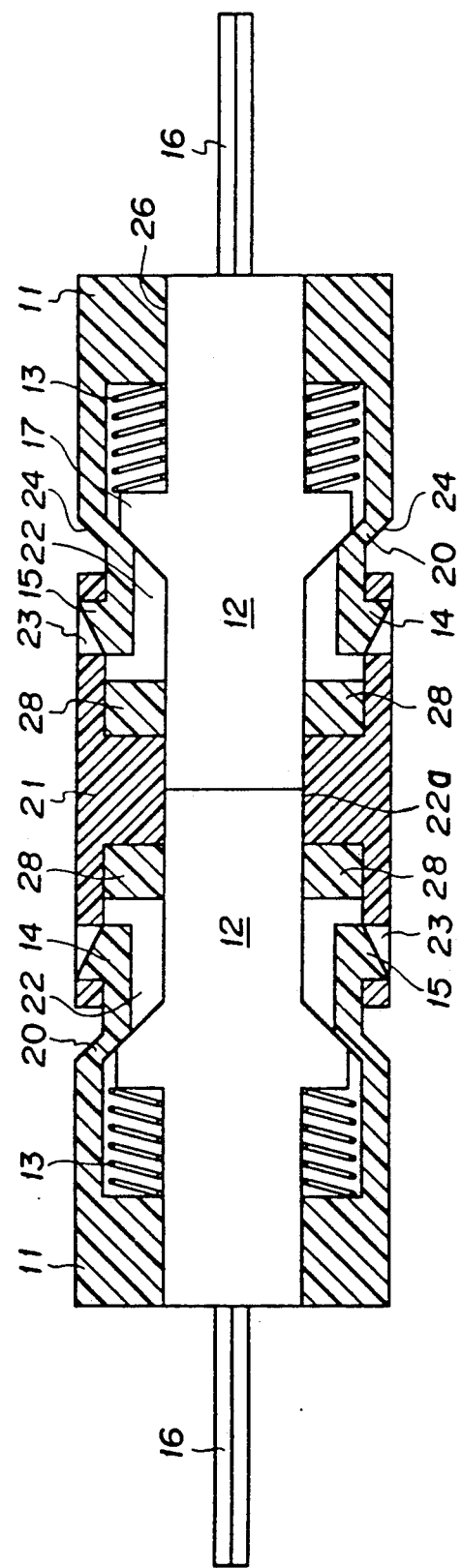
FIG. 5 is a plan view, horizontally cut into a half, showing a connected state of optical connectors according to the above-mentioned one embodiment of the present invention.
Figure 6:
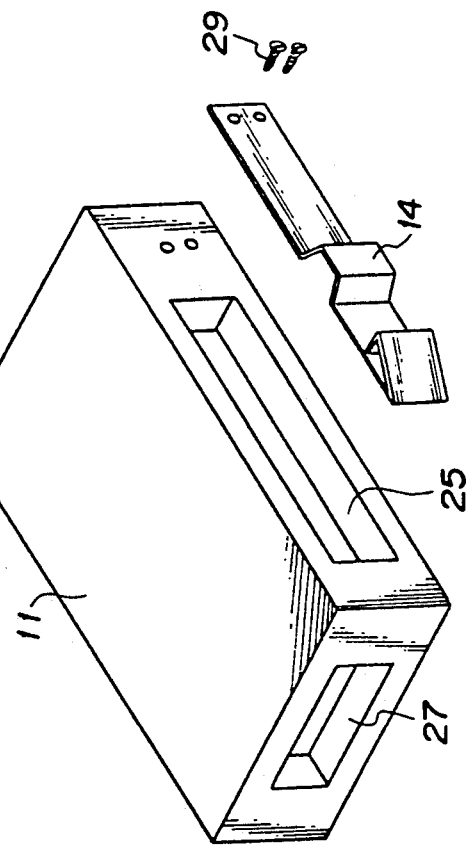
FIG. 6 is an exploded perspective view of a connector housing and a lock arm according to another example of the present invention.
Figure 7:
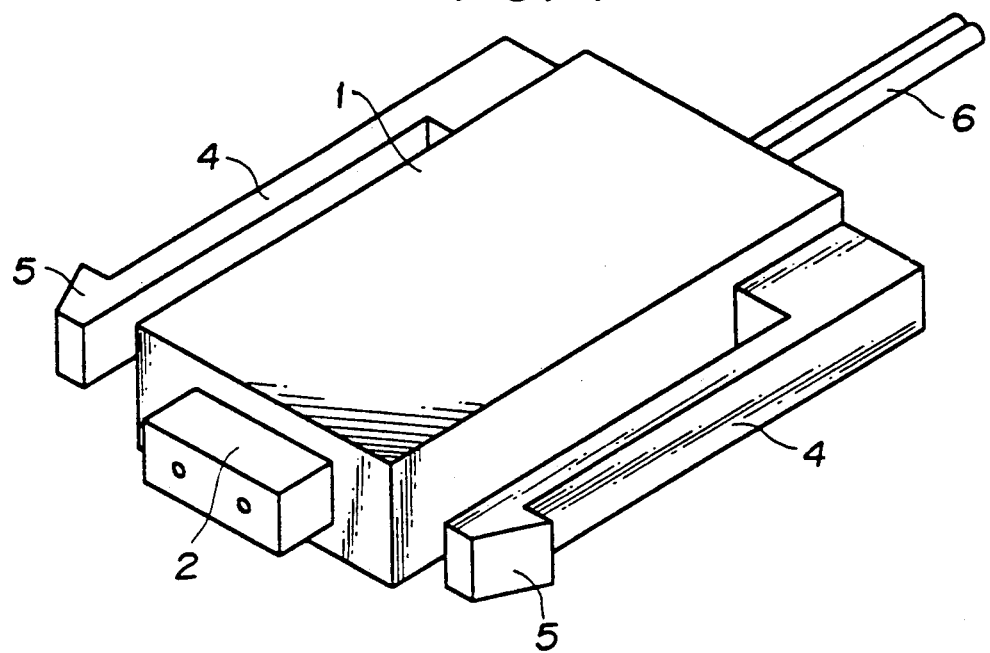
FIG. 7 is a perspective view of a conventional optical connector.
Figure 8:
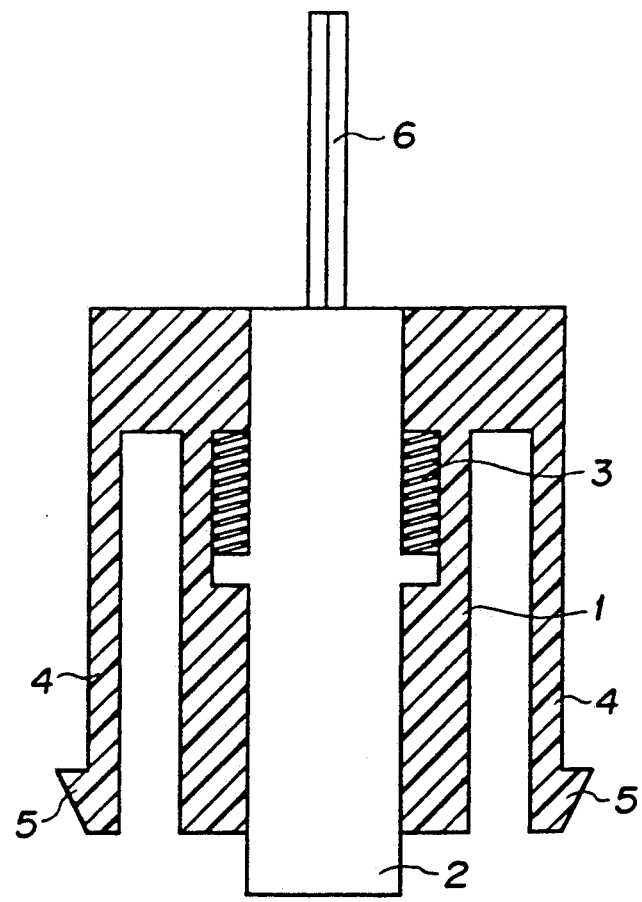
FIG. 8 is a plan view, horizontally cut into a half, thereof.

As is shown in FIGS. 1 through 5, the connector housing 11 and the lock arms 14 are integrally formed in the above-mentioned arrangement or otherwise, as shown in FIG. 6, the lock arms 14 are formed of separate parts such as plate springs, etc. and such lock arms 14 are disposed along the side openings 25 of the longitudinal side surfaces of the connector housing 11 and secured to the side surfaces of the rear end portion of the connector housing 11 by machine screws 29, etc. in order to obtain the above-mentioned arrangement. Further, the lock arms 14 and the cable holder 12 are resiliently contacted with each other through inclined guides disposed in places opposite with each other. For example, an inclined surface 18 spreading out like an unfolded fan toward the rear end is formed on the front surface of each lug 17 so that the inclined surface 18 can be commonly used as an inclined guide, an intermediate portion of each lock arm 14 opposite the inclined guide 17 having a spring bearing function is bent inwardly at angles or the like to form an inclined guide 20 having an inclined surface 19 at its inner surface, and both the inclined guides 17 and 20 are arranged in such a manner as to be opposite with respect to each other so as to be resiliently contacted with each other by the forward biasing force of the springs 13. That is, the lock arms 14 and the cable holder 12 are resiliently contacted with each other by the springs 13 for biasing the holder 12 through the inclined surfaces 17 and 20, and as a result, the lock arms 14 are resiliently supported from inner sides thereof by the cable holder 12.

The springs 13 act as means for butt connection by applying a forward biasing force F1 to the cable holder 12 as shown in FIG. 4, and also as means for resiliently supporting the lock arms 14 by applying a sideward force F2 thereto through the inclined guides 17 and 20.

Although the inclined guides 17 and 20 are disposed to places of the cable holder 12 and the lock arms 14 opposite with respect to each other in the above embodiment, it may be designed such that the inclined guide is provided to one of the holder 12 and arms 14, and the remainder is resiliently contacted thereto. Owing to the foregoing constitution, upon application of an external force to the front end side, the lock arms 14 are displaced toward the interior of the side openings 25 against resiliency thereof at the inner side of the end wall 28. That is, the lock arms 14 can be displaced in the approaching direction (inward direction) to the cable holder 12 against the resiliency, and can be restored to the departing direction (outward direction) from the holder in compliance with the resiliency. When the lock arms 14 are resiliently displaced inward by manual operation, etc., the lock arms 14 urge the cable holder 12 backward against the bias of the springs 13 through the inclined guide 17 or 20 while being slid thereon. By this, there can be obtained an inward displacement which the lock arms 14 require, and the connection and disconnection with the objective member can be performed properly by the retaining claws 15. On the contrary, when the external force applied to the lock arms 14 is canceled and the arms 14 are restored outwardly to realize a connected relation with the objective member, the cable holder 12 is moved forward urged by the springs 13 to maintain the state where the lock arms 14 are urged and supported by the inclined guide 17 and-/or 20 from inner sides thereof.

FIG. 5 is a plan view, horizontally cut into a half, showing two optical connectors which are in a butt-connection with respect to each other through a connection adapter 21. The connection adapter 21 has receiving openings 22 formed at front and rear portions thereof and adapted to receive the connector housing 11 therein, and each of the receiving openings 22 has a connection opening 22a formed in its central portion and adapted to permit the front end of the cable holder 12 to be inserted therein to realize the butt-connection. The adapter 21 also has retaining portions 23 for retaining the the claws 15 of the lock arms 14, which are formed on the both side walls of each of the receiving openings 22.

When both the optical connectors are inserted into the receiving openings 22 and the front ends of the connector housings 11 are brought into abutment with the inner bottom surfaces of the receiving openings 22, the front ends of the cable holders 12 are inserted into the connection openings 22a and are brought into a butt-connected state with each other by the springs 13. At the same time, the retaining claws 15 of the lock arms 14 inserted into the receiving openings 22 are retained at the retaining portions 23, thus maintaining the connected state and the butt-connected state between the above-mentioned two optical connectors and thus realizing the opposing connection between the cores 16a. At this time, the inclined guide portions 20 of the lock arms 14 are located outside the receiving openings 22, and pressure bearing portions are formed by the outer inclined surfaces 24 of the inclined guide portions 20 so as to facilitate an easy urging operation.

According to the present invention, the connector housing is provided with openings at its portions which originally form the longitudinal side walls thereof, and the lock arms are disposed in such a manner as to extend along the openings. Accordingly, the dimension in the width direction of the optical connector can be reduced extensively and as a result, a small size of the optical connector can be achieved effectively.

Further, the resilient displacement of the lock arms necessary for obtaining the connection and disconnection of the lock arms can be obtained by the pushing-down action of the lock arms made to the cable holder against the bias of the springs and by the canceling action of the pushing-down action both through the inclined guides, so as to move the cable holder forward and backward. In this way, while achieving a small size of the optical connector by arranging the lock arms in the above-mentioned places, there can be obtained a proper operation of the lock arms. Furthermore, since the lock arms are normally resiliently urged and supported from the inner surface side by the cable holder and the springs for biasing the cable holder through the inclined guides when the lock arms are displaced inwardly and outwardly, the fatigue of the lock arms due to repeated use can be prevented effectively and the lock arms can normally be functioned soundly. In addition, by making the lock arms more slender or shorter, there can be satisfied both incompatible requirements for making the optical connector small in size and providing favorable operability.

Furthermore, according to another aspect of the present invention, the connector housing is provided with side openings at its portions which originally form the longitudinal side walls thereof, and the lock arms are disposed in such a manner as to extend along the openings. Accordingly, the dimension in the width direction of the optical connector can be reduced extensively and as a result, a small size of the optical connector can be achieved effectively.

Moreover, by virtue of the provision of end wall disposed in such a manner as to be opposite the front end faces of the lock arms, a possible impact applied to the arms from front can be avoided, and the problem of possible breakage of the lock arms can be solved effectively when the optical connector is inserted by mistake or when it is accidentally dropped.

In addition, since the inner surfaces of the front end (free end) portions of the lock arms are hidden in the side openings and the front end faces are blocked with the end wall, there can be obviated such inconvenience as that other substance is caught by or twisted on the lock arm or arms.

Although the present invention has been described with reference to a preferred embodiment, this description is not meant to be construed in a limiting sense. Various changes and modifications of the disclosed embodiment as well as alternative embodiments of the present invention will become apparent to those skilled in the art upon reference to the description of the invention. It is therefore contemplated that the appended claims will cover any such changes, modifications, or embodiments that fall within the true scope of the invention.

What is claimed is:

1. In an optical connector in which a cable holder reciprocally movably accommodated within a connector housing is urged forward by springs to expose a front end of said holder from a front end of said connector housing, a pair of lock arms are disposed along the longitudinal side portions of said connector housing, and said lock arms are resiliently displaced inwardly at front ends thereof where retaining claws are formed, so as to cancel a connected state with an objective member and restored outwardly in order to obtain a connected state with said objective member, the improvement comprising: said pair of lock arms be disposed along the longitudinal side surfaces of said cable holder, said springs being disposed in spaces formed between said lock arms and the longitudinal side surfaces of said cable holder, said lock arms and said cable holder being resiliently contacted with each other by said springs through inclined guides which are formed on one or both opposing places, the cable holder being pushed down backwardly against the springs through the inclined surfaces when the lock arms are resiliently displaced inwardly to cancel the connected relation, and the cable holder being progressed forwardly urged by the springs to urgedly support the lock arms from inner sides thereof through the inclined guides when the lock arms are restored outwardly.

2. In an optical connector in which a cable holder is accommodated within a connector housing, a pair of lock arms adapted to be connected with an objective member are disposed in such a manner as to extend along the longitudinal sides of said connector housing, said lock arms are resiliently displaced inwardly and outwardly at front ends thereof where retaining claws are formed, so as to realize a connected state and cancel a connected state with said objective member, the improvement comprising: side openings be formed in the longitudinal side surfaces of said connector housing, said lock arms be disposed in such a manner as to extend along said side openings so that front end portions of said lock arms can be resiliently displaced into said side openings, and said connector housing is provided with an end wall opposite front end faces of said lock arms and defining said side openings.

* * * * *